United States Patent [19]

Nakajima et al.

[11] 4,361,410
[45] Nov. 30, 1982

[54] DRIVE SYSTEM FOR PULSE MOTOR

[75] Inventors: Fumio Nakajima, Tokyo; Takayasu Machida, Iruma; Kenji Yamada, Koganei, all of Japan

[73] Assignee: Citizen Watch Company Ltd., Tokyo, Japan

[21] Appl. No.: 158,493

[22] Filed: Jun. 11, 1980

Related U.S. Application Data

[63] Continuation of Ser. No. 942,869, Sep. 15, 1978, abandoned.

[30] Foreign Application Priority Data

Sep. 26, 1977 [JP] Japan .................. 52-114720
Jan. 27, 1978 [JP] Japan .................... 53-8068

[51] Int. Cl.³ .................. G06F 1/04; G04C 3/00; G05B 19/40
[52] U.S. Cl. .................. 368/157; 368/217; 318/696
[58] Field of Search .............. 368/76, 80, 85–87, 368/155–157, 160, 217–219; 318/138, 696

[56] References Cited

U.S. PATENT DOCUMENTS

| 3,599,069 | 8/1971 | Welch | 318/696 |
| 3,855,781 | 12/1974 | Chihara et al. | 368/28 |
| 4,037,145 | 7/1977 | Bailey et al. | 318/341 |
| 4,107,595 | 8/1978 | Camps | 318/138 |
| 4,114,364 | 9/1978 | Takahashi | 368/219 |
| 4,129,981 | 12/1978 | Nomura et al. | 368/96 |

Primary Examiner—Vit W. Miska
Attorney, Agent, or Firm—Holman & Stern

[57] ABSTRACT

In a circuit for driving a pulse motor of an electronic timepiece, the initial part or entirety of each drive pulse is modulated to form a group of high frequency pulses thereby reducing an initial surge of current while rotor of motor is still stationary. Modulation can be controlled according to load placed on motor to provide increased drive energy for heavy loading.

4 Claims, 39 Drawing Figures

DRIVE SYSTEM FOR PULSE MOTOR

This is a continuation of application Ser. No. 942,869, filed Sept. 15, 1978, now abandoned.

This invention relates to methods of driving pulse motors used in electronic timepieces, and to systems for decreasing the power consumption of such motors and enabling motors of smaller size and greater ease of manufacture to be utilized in electronic timepieces.

Pulse motors (sometimes referred to as stepping motors) are frequently used in electronic timepieces of analog type, to drive the timepiece hands and in some cases to actuate a date display mechanism. Such a pulse motor is driven by a train of separate pulses of alternating polarity and constant voltage applied to the drive coil of the motor, these pulses generally being generated with a period of one second. One disadvantage of conventional designs of drive circuits for such pulse motors is that an unnecessarily large current is drawn by the drive coil of the motor during the initial part of each drive pulse. This is due to the fact that at the beginning of a pulse, the rotor of the pulse motor has not yet begun to move, so that no voltage is generated by the drive coil acting in oposition to the drive voltage. This voltage is generally referred to as the reverse electromotive force, or reverse EMF. Thus, in order to hold the current drawn by the pulse motor during the first part of each drive pulse to a sufficiently low level, it is necessary to use a large number of turns of wire having extremely small diameter for the drive coil. This greatly increases the cost of manufacturing such pulse motors, and causes the manufacturing yield to be reduced. Another cause of excessive power consumption at the start of each drive pulse is that the current drawn by the drive coil increases to a high value very rapidly, so that the waveform of the drive current contains many high frequency harmonic components. These increase power lost by eddy current losses and hysteris losses in the core of the rotor.

With a drive circuit in accordance with the present invention, at least the initial part of each drive pulse is made to consist of a series of high frequency pulses, which can be of gradually increasing pulse width. This ensures that the current drawn by the drive coil during the first part of a drive pulse increases relatively gradually, and thereafter remains approximately constant for the duration of the drive pulse. Thus, the disadvantages of the conventional drive method can be overcome. Since the current drawn by the drive coil of the pulse motor can be controlled by means of the high frequency pulses, it is possible to produce a pulse motor having a very low level of power consumption yet utilizing wire of significantly larger diameter of fewer turns for the drive coil than in the case of a pulse motor with which a conventional drive circuit is utilized. Thus, the manufacturing cost of the pulse motor can be significantly reduced, and it becomes possible to use pulse motors of significantly reduced size than has been heretofore possible.

In addition, with a conventional system of driving a pulse motor, the drive coil of the motor is generally left in an open circuit condition between the application of drive pulses, i.e. no current can flow through the drive coil except when a drive pulse is being applied. Thus, the energy left stored in the inductance of the drive coil at the cessation of a drive pulse is not utilized, and the electromotive force generated by rotation of the rotor is not utilized to damp the movement of the rotor. It is therefore possible for the rotor to be stepped twice in succession by a single drive pulse, due to the lack of damping. With a drive system for a pulse motor is accordance with the present invention, it is possible to establish a short circuit condition between the ends of the drive coil upon the cessation of a drive pulse, so that damping of the rotor motion is achieved.

There have also been methods proposed whereby the reverse EMF generated by the motion of the rotor is detected. Since the amplitude of the reverse EMF is proportional to the angular velocity of the rotor, it indicates the amount of load being imposed upon the pulse motor. This load can vary for such reasons as driving a date indication mechanism, etc., and it is desirable to provide increased drive energy for the motor when such an abnormally heavy load is applied. It has therefore been proposed to detect the amplitude of the reverse EMF at a short time after each drive pulse ends, and to control the duration of the drive pulses in accordance with the results of this detection. However with such a method, since the duration of the drive pulses may be extended such as to overlap the point in time at which detection of the reverse EMF is performed, detection may become unreliable or impossible. With a drive circuit for a pulse motor in accordance with the present invention, each drive pulse can be modulated to consist of a series of short pulses, the duty cycle of which can be increased when an abnormally high load on the motor is detected. Since the overall duration of each drive pulse (i.e. group of high frequency pulses) is almost constant, detection of the reverse EMF of the drive coil can be performed after a fixed time interval following each drive pulse. There is thus no danger of the drive pulses overlapping the detection points.

It is therefore an object of the present invention to provide an improved circuit for driving a pulse motor utilized in an electronic timepiece.

More particularly, it is an object of the present invention to provide an improved circuit for driving a pulse motor whereby the power consumption of said pulse motor is substantially reduced by comparison with conventional circuits.

It is a further object of the present invention to provide an improved circuit for driving a pulse motor whereby a short circuit condition is established across the ends of the drive coil of said pulse motor upon completion of each drive pulse.

It is yet a further object of the present invention to provide an improved circuit for driving a pulse motor whereby the drive pulses applied to said pulse motor consist wholly or partially of groups of high frequency pulses whose duty cycle can be controlled to compensate for variations in the load imposed upon said pulse motor.

Further objects, features and advantages of the present invention will be made more apparent by the following description and the accompanying drawings, the scope of which is given by the appended claims.

In the accompanying drawings, in which:

FIGS. 5(1) through 5(7) are waveform diagrams showing waveforms of various signals produced in the circuit of FIG. 4;

FIGS. 6(1) through 6(7) are waveform diagrams illustrating alternate methods of pulse modulation for the first embodiment shown in FIG. 3;

FIGS. 10(a) through 10(j) are waveform diagrams for the circuit shown in FIG. 9 when a normal load is applied to the pulse motor of the timepiece; and FIGS. 11(a) through 11(h) are waveform diagrams for the circuit shown in FIG. 9 when an abnormally high load is applied to the pulse motor of the timepiece.

Figure 1:
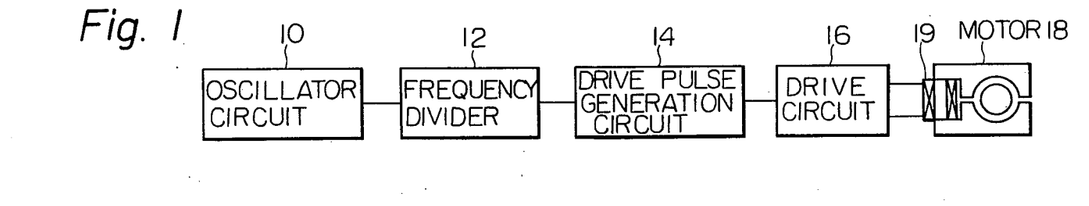
FIG. 1 is a block diagram of an electronic timepiece of conventional design utilizing a pulse motor.

Referring now to the drawings, FIG. 1 is a block diagram showing an electronic timepiece of conventional design, utilizing a pulse motor. A standard high frequency signal is generated by oscillator circuit 10, which is generally a quartz crystal controlled oscillator circuit. This standard high frequency signal is applied to a frequency divider circuit 12, which produces a standard time signal to be applied to drive pulse generation circuit 14. Input drive pulses produced by drive pulse generation circuit 14 are applied to a drive circuit 16, which generates drive pulses of constant voltage and alternately reverse polarity to be applied to drive coil 19 of pulse motor 18.

Figure 2:
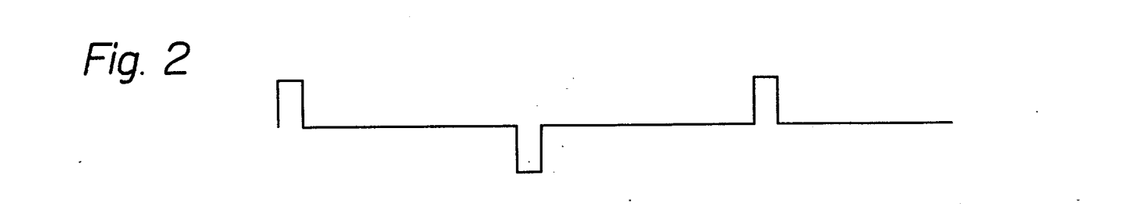
FIG. 2 is a waveform diagram of the drive pulses applied to the pulse motor of FIG. 1.

The waveform of the drive pulses applied to drive coil 19 is shown in FIG. 2.

Figure 3:
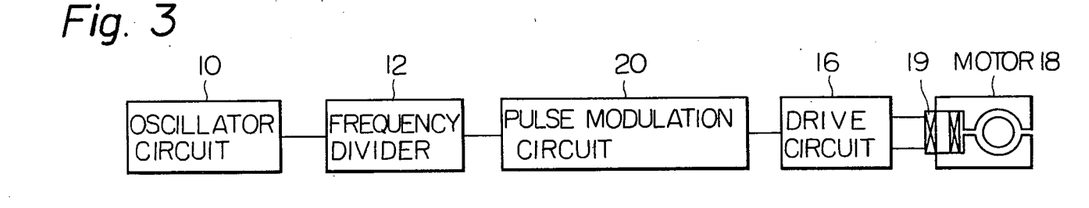
FIG. 3 is a block diagram of a first embodiment of an electronic timepiece in accordance with the present invention.

FIG. 3 is a block diagram of a first embodiment of a circuit for an electronic timepiece in accordance with the present invention. The functions of oscillator 10 and frequency divider 12 are as described for the block diagram shown in FIG. 1. Pulse modulation circuit 20 serves to produce input drive pulses in which the initial part of each drive pulse is modulated to comprise a series of relatively short pulses of varying pulse width. These are applied to drive circuit 16 which produces corresponding drive pulses of alternately opposite polarity which are applied to drive coil 19 of pulse motor 18.

Figure 4:
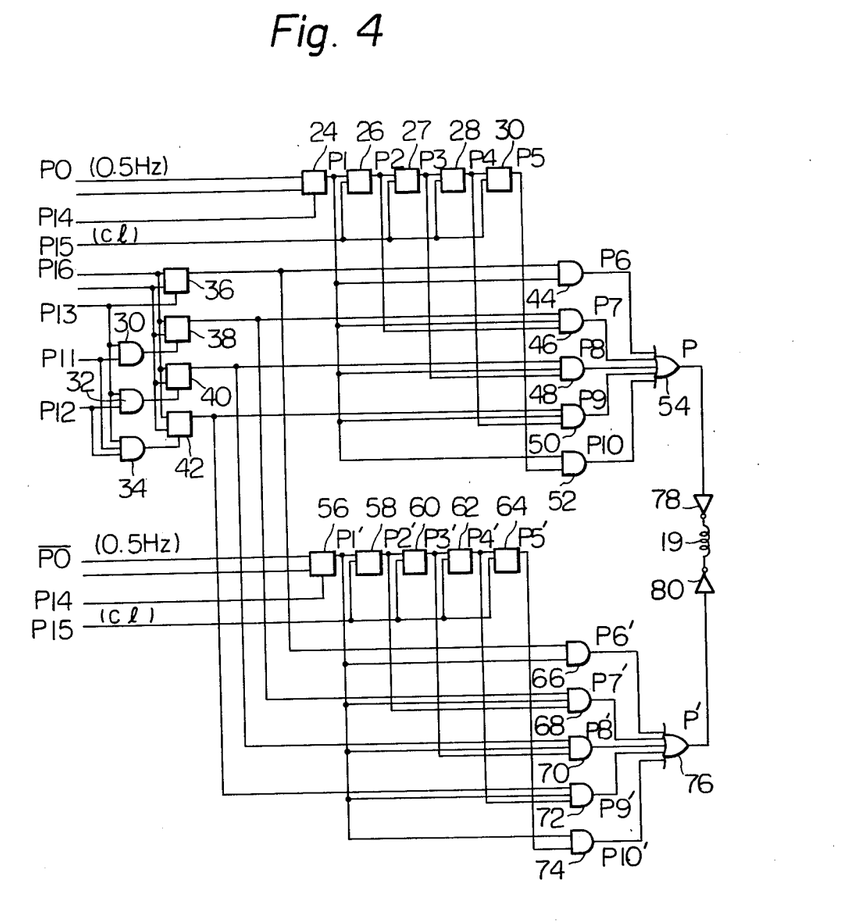
FIG. 4 is a circuit diagram of a modulation circuit for the embodiment shown in FIG. 3.
Figure 5:
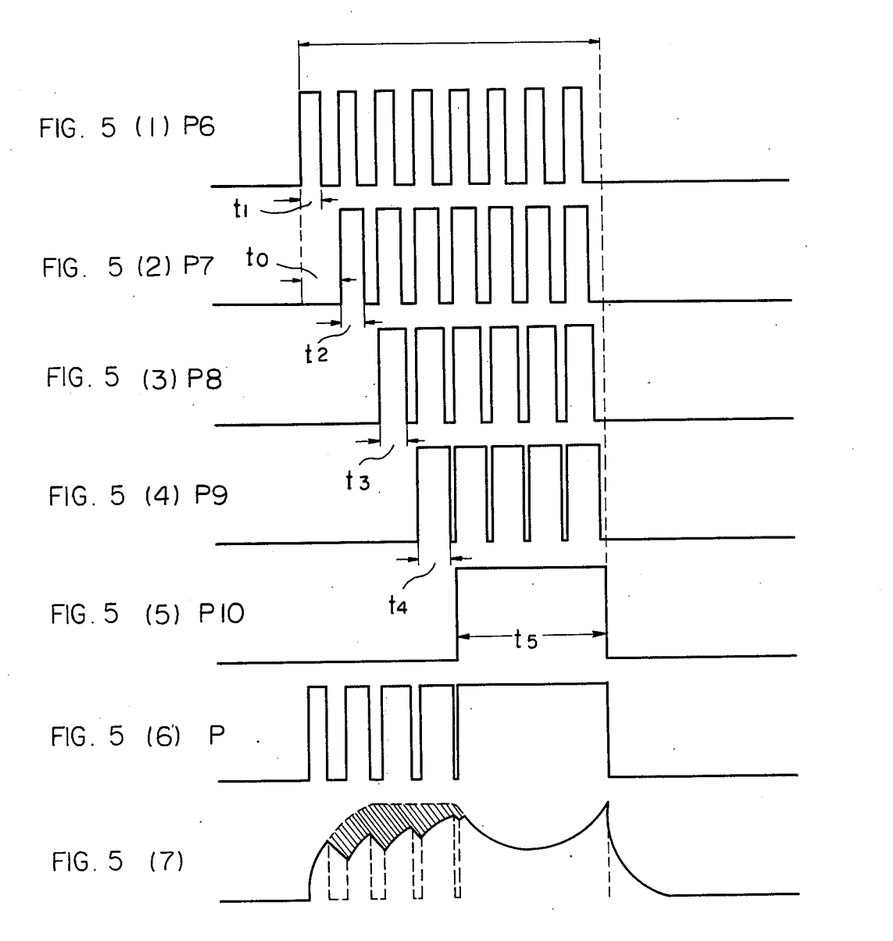
Figure 6:
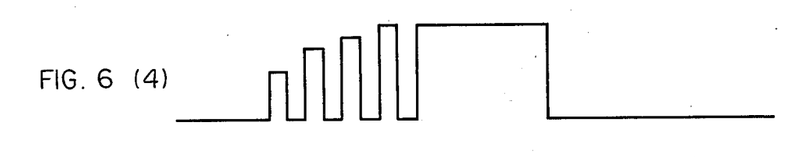

FIG. 4 is an example of a circuit arrangement for pulse modulation circuit 20, with drive circuit 16 being indicated in simplified form. Signals P0 and $\overline{P0}$, P11, P12, P13, P14, P15 and P16 are outputs from various stages of frequency divider 12 shown in FIG. 3, with signal P0 having the lowest frequency (0.5 Hz) and P16 having the highest frequency. Signals P0 and P14 are applied to a flip-flop (referred to hereinafter as FF) 24, causing FF24 to produce signal P1 which consists of pulses with width t. For the embodiment described herein, t is equal to 1/128 seconds. FF26, FF27, FF28 and FF30 are data type flip-flops, with signal P1 being applied to the data terminal of FF 26, output signal P2 from FF 26 being applied to the data terminal of FF 27, signal P3 from FF 27 being applied to the data terminal of FF 28, and output P4 of FF 28 being applied to the data terminal of FF 30. Signal P15 is applied to the clock terminals of FF 26, FF 27, FF 28, and FF 30. Signals P2, P3, P4 and P5 are generated as a group of four successive pulses after each leading edge of signal P0 occurs, and are successively delayed in phase by $t_0$, where $t_0 = 1/1024$ seconds, since the frequency of clock signal P15 is 1.024 KHz. The inverse of signal P0, i.e. $\overline{P0}$, is applied to FF 56. FF 58, 60, 62 and 64 serve to produce signals P2', P3', P4', and P5'. These correspond to P2, P3, P4 and P5, but are generated as a group on each leading edge of $\overline{P0}$, i.e. 180° part from signals P2, P3, P4 and P5 with respect to signal P0.

AND gates 30, 32 and 34 and FF 36, FF 38, FF 40 and FF 42 serve to produce trains of high frequency pulses with the same frequency but having different duty cycles. For this embodiment, the frequency of these pulse trains is 1.024 KHz and the pulse durations of the pulses from FF 36, FF 38, FF 40 and FF 42 are designated as t1, t2, t3 and t4, respectively. These are combined with pulses P1, P2, P3, P4 and P5 in AND gates 44, 46, 48, 50 and 52 to produce signals P6, P7, P8, P9 and P10, which are combined in OR gate 54 to produce signal P. The outputs from FF 36, FF 38, FF 40 and FF 42 are also combined with signals P1', P2', P3', P4', and P5' in AND gates 66, 68, 70, 72 and 74, to produce signals P6', P7', P8', P9', and P10', which are combined to OR gate 76 to produce signal P'. Signals P and P' comprise the input drive signals which are alternately applied once per second to opposite ends of the drive coil 19 of a pulse motor through drive amplifiers 78 and 80, which constitute drive circuit 16.

FIG. 5 shows the waveforms of various signals in the circuit of FIG. 4. It can be seen that P6 comprises groups of high frequency pulses with pulse width t1, the duration of each group of pulses being t. For this embodiment, t is equal to 1/128 seconds. Signal P7 comprises groups of high frequency pulses, each pulse having duration t2 and each group of pulses beginning after a delay of $t_0$ with respect to the start of a P6 group. Similarly, signal P8 comprises groups of high frequency pulses, each pulse having duration t3 and each group beginning after a delay of $2t_0$ with respect to the start of a P6 group. P9 comprises groups of high frequency pulses, each pulse having duration t4 and each group of pulses beginning after a delay of $3t_0$ relative to the start of a P6 group. For this embodiment of the present invention, signal P10 comprises single pulses with duration t5, each of which begins after a delay of $4t_0$ relative to the start of a group of P6 pulses. The effect of combining signals P6, P7, P8, P9 and P10 in OR gate 54 is shown as signal P in FIG. 5. The waveform of the current which flows in drive coil 19 as a result of signal P being applied is shown at FIG. 5(7). The broken line curve indicates the waveform of the initial current flow in the case of a conventional drive pulse system, i.e. when continuous drive pulses are used. The solid line indicates the current which flows as a result of a drive signal of the form of signal P, i.e. when the initial part of each drive pulse consists of separate pulses of gradually increasing pulse width. It can be seen that for a drive system in accordance with the present invention, the current drawn by the pulse motor increases gradually, and that the total current drawn is less than in the case of a conventional drive system, as indicated by the hatched portion of the diagram. During the latter half of a drive pulse, the current drawn by the pulse motor decreases, due to the fact that a reverse EMF is generated by the movement of the rotor. It is apparent that with a drive circuit in accordance with the present invention, the current drawn by the drive coil of the pulse motor can be held to a more constant level during each drive pulse than in the case of a conventional drive circuit, and that a sudden surge of current at the beginning of each drive pulse is prevented.

It is possible to utilize a greater number of high frequency pulses to modulate each drive pulse than in the embodiment described above. If this is done, then the power consumption of the pulse motor can be further reduced, since high frequency harmonics in the drive current are reduced, so that eddy current losses (which are proportional to the square of the frequency) and hysteresis losses (which are directly proportional to frequency) are reduced. A pulse motor drive circuit in accordance with the present invention can have a power consumption as low as 0.5 microamperes, which is a significant reduction over conventional methods. Such a drive circuit is therfore highly suited to an electronic timepiece of small size which is powered by a miniature battery having low capacity. In addition, with the conventional method of generating drive pulses, it is necessary to use wire of very small diameter for the drive coil, and to use a relatively large number of turns. This is because the current drawn by the drive coil of the pulse motor during the initial part of each drive pulse is limited only by the inductance and resistance of the drive coil, so that these must be kept high in order to achieve low power consumption by the pulse motor. However, when a drive circuit in accordance with the present invention is used, the current drawn by the pulse motor during the initial part of each drive pulse is limited by means of modulating the drive pulses as described above, so as to make the initial part of each drive pulse consist of a group of high frequency pulses of gradually increasing pulse width. It is therefore not necessary to utilize extremely small diameter wire for the drive coil windings, and a smaller number of turns of larger diameter wire can be used for the drive coil. This greatly reduces the difficulties heretofore encountered in the manufacture of such pulse motors, and increases the manufacturing yield significantly, since the number of defective units produced is reduced. This fact enables the manufacturing cost of pulse motors for electronic timepieces to be significantly reduced. In addition, utilization of a drive circuit in accordance with the present invention enables the overall size of the pulse motor to be reduced, since the size of the drive coil can be reduced. Pulse motors suitable for use in electronic timepiece of extremely small size can therefore be manufactured economically.

A method of drive pulse modulation whereby the pulse durations of component high frequency pulses in each drive pulse are gradually increased has been described for the first embodiment of the present invention. However various other methods of drive pulse modulation are also possible, which fall within the scope of the present invention. Some examples of these are shown in FIG. 6. In FIG. 6(1), the second part of each drive pulse is also modulated, by a series of high frequency pulses of successively decreasing pulse width. In FIG. 6(2), the first half of each drive pulse is consists of a group of high frequency pulses of fixed pulse width, with phase modulation being applied to these high frequency pulses. In FIG. 6(3), each drive pulse consists of high frequency pulses to which phase modulation is applied. In FIG. 6(4), the first half of each drive pulse consists of high frequency pulses of fixed pulse width to which amplitude modulation is applied. In FIG. 6(5), both the first and second halves of each drive pulse consists of high frequency pulses of fixed pulse width to which amplitude modulation is applied. In FIG. 6(6), each drive pulse consists of a continuous pulse, to the first half of which step type amplitude modulation is applied. In FIG. 6(7), each drive pulse consists of a continuous pulse, to which step type amplitude modulation is applied, as shown.

It is also possible to utilize a combination of two or more of the methods shown in FIG. 6.

Figure 7:
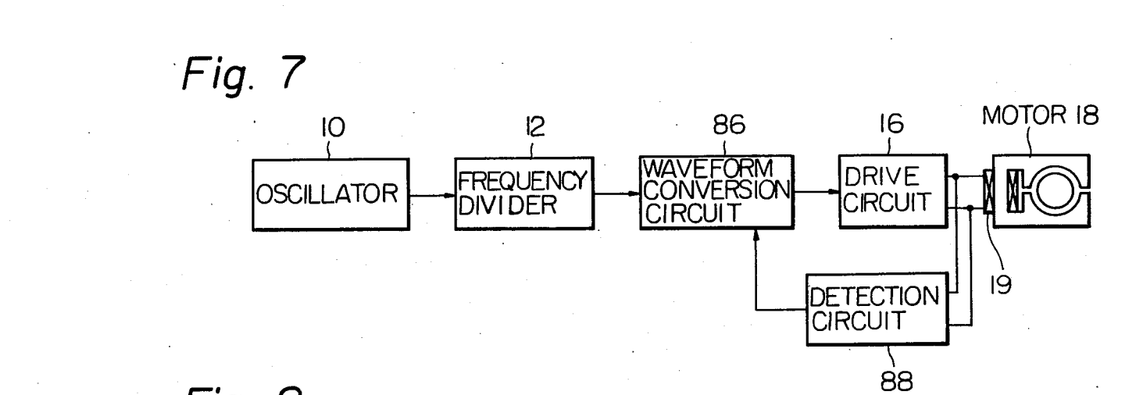
FIG. 7 is a block diagram of an electronic timepiece using a method known in the prior art for controlling drive pulse duration applied to the pulse motor in accordance with the load on the motor.

Referring now to FIG. 7, a block diagram is shown therein of a circuit for an electronic timepiece employing a pulse motor, and means for detecting the level of load imposed upon the motor. Numeral 10 indicates an oscillator circuit such as a quartz crystal controlled oscillator which applies a standard high frequency signal to a frequency divider 12. A standard timekeeping signal from frequency divider 12 is applied to a waveform conversion circuit 86. Pulses from waveform conversion circuit 86 are applied to a drive circuit 16, which applies drive pulses of alternating polarity to drive coil 19 of pulse motor 18. The back EMF generated by the movement of the rotor of pulse motor 18, after cessation of each drive pulse, is detected by detection circuit 88. Under normal load upon pulse motor 18, the rotor of the motor will continue to move relatively quickly for a shorttime after the end of each drive pulse. A relatively high level of back EMF will therefore be detected by detection circuit 88. When a heavy load is imposed upon pulse motor 18, due for example to the motor driving a date display mechanism in the timepiece, then rotor will move more slowly after the cessation of each drive pulse. Thus, the level of back EMF detected by detection circuit 88 will drop, as compared with the normal load condition. Output signals from detection circuit 88 are applied to waveform conversion 86 so as to cause the duration of the drive pulses to be increased when an abnormally high load upon pulse motor 18 is detected. This method of drive pulse control has been described previously. The increased duration of drive pulses in the event of a heavy load on the pulse motor serves to provide additional energy to operate pulse motor 18, so as to ensure reliable operation. The back EMF produced by drive coil 19 is usually detected at a fixed time after each drive pulse has ended. However since the duration of the drive pulses is increased when a heavy load is applied, it is possible for the drive pulses to overlap into the detection time point, so that detection becomes unreliable.

Figure 8:
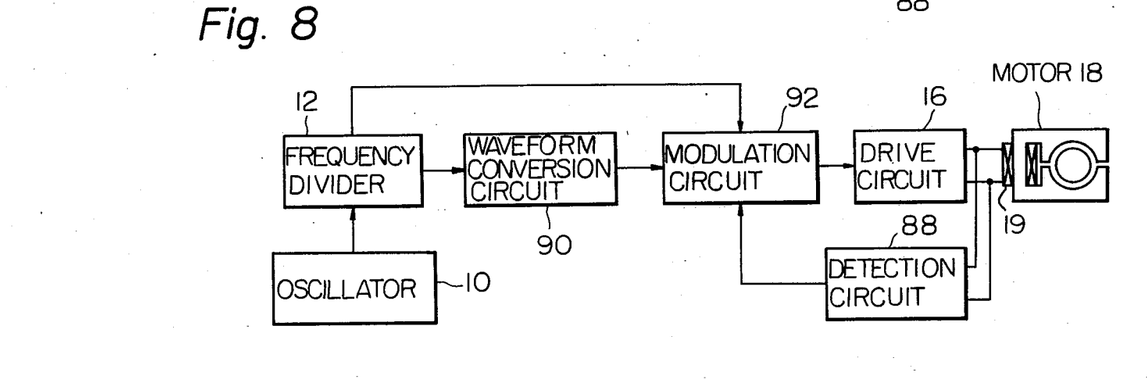
FIG. 8 is a block diagram of an electronic timepiece in accordance with a second embodiment of the present invention, whereby drive pulses consist of groups of high frequency pulses of controlled duty cycle.
Figure 9:
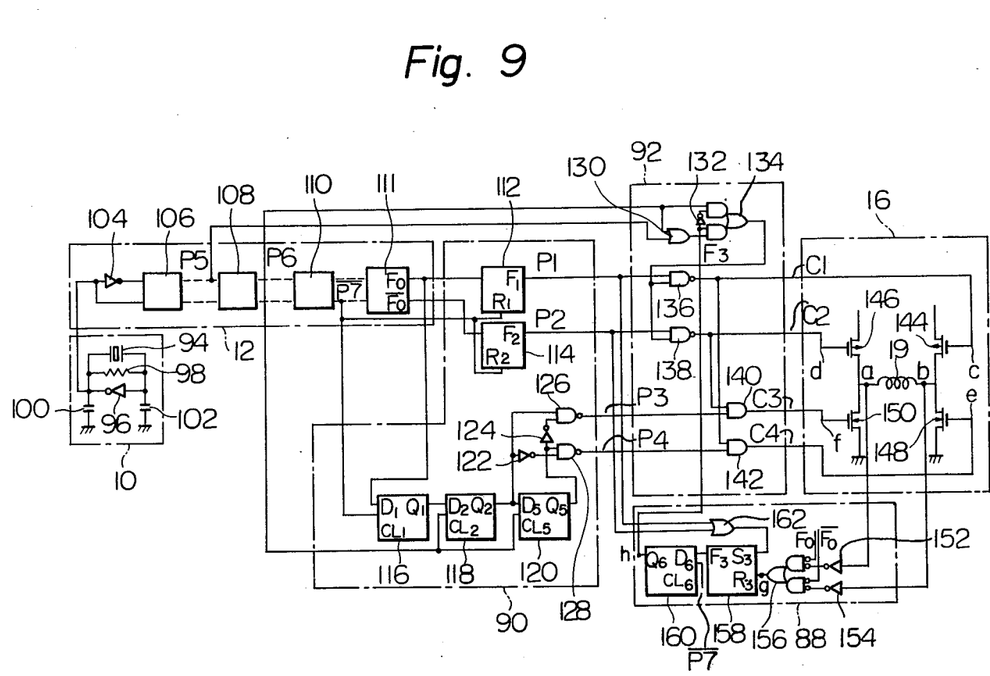
FIG. 9 is a circuit diagram of an example of an electronic timepiece in accordance with the second embodiment of the present invention shown in FIG. 8.

FIG. 8 is a block diagram of a circuit for an electronic timepiece in accordance with a second embodiment of the present invention. As in FIG. 7, an oscillator circuit 10 applies a standard high frequency signal to a frequency divider circuit 12. Signals produced by frequency divider 12 are applied to a waveform conversion circuit 90 and to a modulation circuit 92. Output signals from waveform conversion circuit 90 are also applied to modulation circuit 92. Modulation circuit 92 produces groups of high frequency pulses, each group corresponding to a drive pulse for motor 18, with the duty cycle of the high frequency pulses being varied in accordance with the load imposed upon pulse motor 18. This duty cycle is controlled by signals produced from a detection circuit 88, which detects the back EMF produced by drive coil 19 at fixed points in time following each drive pulse. In addition, drive circuit 16 is controlled such that a short circuit is established between the ends of drive coil 19 at the end of each drive pulse, except for a short time during which detection of the reverse EMF produced by the motor is detected by detection circuit 88. This short circuit condition serves to damp the motion of the rotor of motor 18, so that there is no possibility of the motor being actuated twice by a single drive pulse. The operation of this embodiment of the present invention may be more readily understood by reference to an example of circuitry for various parts of the timepiece, shown in FIG. 9, and by the waveform diagrams of FIG. 10 and 11. In FIG. 9, a high frequency standard signal is produced by oscillator circuit 10, which comprises a quartz crystal vibrator 94 determining the frequency of the oscillator, an inverting amplifier 96, feedback resistor 98 and input and output capacitors 102 and 100. The output signal from oscillator circuit 10 is applied to a frequency divider circuit 90. For the circuit of this embodiment, normal and inverted input signals are required for the flip-flops of the frequency divider, and these inputs are provided for the first stage 106 by means of inverter 104. Output P5 of frequency divider 90, which is of high frequency, is applied to an input terminal of OR gate 130 of modulation circuit 92. Output signal P6, which is of lower frequency than P5, is applied to the other input of OR gate 130 and to an input of selector circuit 134 in modulation circuit 92. The output from OR gate 130 consists of a high frequency pulse train of the same frequency as P6 but with a duty cycle which is 1.5 times the duty cycle of signal P6. The normal and inverted output signals F0 and F0 from the final stage 111 of frequency divider 94 are applied to flip-flops 112 and 114 in waveform conversion circuit 90, with signal P7 being applied to the reset terminals of 112 and 114. As a result, signals P1 and P2 are produced by FF112 and FF114 respectively. P1 and P2 each have a period of 2 seconds, differ in phase by 180°, and have pulse width t, as shown in waveform diagram FIG. 10. P1 and P2 are applied to NAND gates 136 and 138 in modulation circuit 92 respectively. The output of selector circuit 134 is applied as a modulation signal to the other terminals of NAND gates 136 and 138, so that the output signals from these gates, C1 and C2, have the wave form shown in FIG. 10 when signal P5 is selected by selection circuit 134. C1 and C2 constitute the input drive pulses applied to drive circuit 16.

Figure 10A:
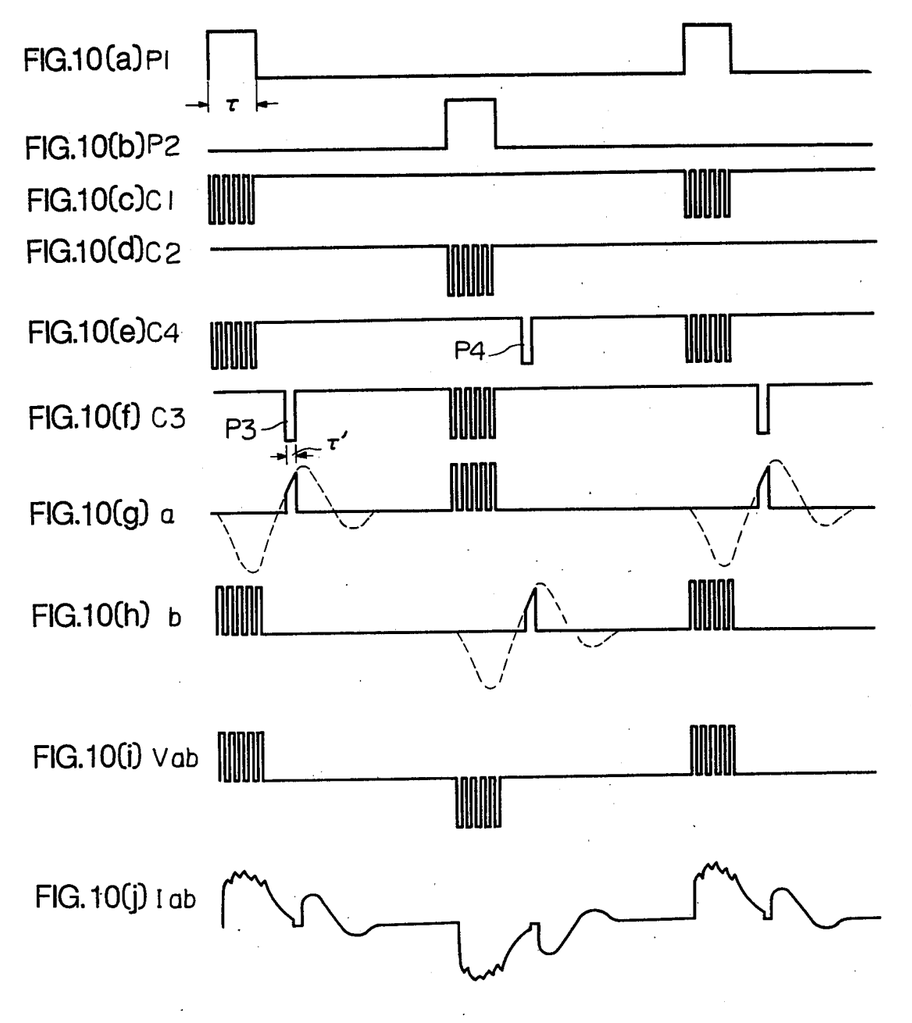

The combination of inverters 122 and 124 together with AND gates 126 and 128 serves to produce short pulses P3 and P4 from input signals applied from the Q output of flip-flop 118 and the Q output of flip-flop 120. P3 and P4 are detection control signals P3 and P4 have a pulse width t' of the order of a few milliseconds or less, and are slightly delayed in phase relative to pulses C1 and C2 respectively, as a result of the phase shifting action of FF 116, FF 118 and FF 120. Pulses P3 and P4 are applied to inputs of AND gates 140 and 142 respectively, while signals C1 and C2 are respectively applied to the other inputs of AND gates 140 and 142. The outputs from AND gates 140 and 142, namely C3 and C4, have the waveform shown in FIG. 10. It can be seen that signals C1 and C2 are normally at the high potential level (referred to hereinafter as the H level), and only fall to the low potential of the power source (referred to hereinafter as the L level) during the high frequency pulse groups which constitute the input drive signals. Signals C3 and C4 are similar, but also fall to the L level for the very short period of occurrence of pulses P3 and P4 respectively, as shown in FIG. 10. Signals C3 and C4 are called drive control signals.

Drive circuit 16 consists of MOS transistors 144, 146, 148 and 150. Signal C1 is applied to the gate of transistor 144. This is a P channel transistor which enters the conducting state which the gate bias with respect to the source terminal is zero. Since the source terminal is connected to the L level, it will be apparent that transistor 144 will only conduct during the periods when C1 goes to the L level during the drive pulses. Similarly, transistor 146 only becomes conductive during the periods when signal C2 goes to the L level. The drain terminal of transistor 144 is connected to the drain terminal of N channel MOS transitor 148, and to one end of drive coil 19 of pulse motor 18. The drain terminal of transistor 146 is connected to the drain of N channel transistor 150 and to the other end of drive coil 19. The source terminals of transistors 148 and 150 are connected to the H level, which corresponds to the ground potential in this embodiment. Thus, transistors 148 and 150 are usually in the conducting condition, but become non-conducting during the periods when signals C4 and C3 go to the L level, respectively. Thus, transistor 148 becomes non-conducting during each of the high frequency pulse timings of signal C1, i.e. when transistor 144 becomes conducting, and also for the duration of pulse P4. Similarly, transistor 150 becomes non-conducting during each of the high frequency pulse timings of signal C2, i.e. when transistor 146 becomes conducting, and also for the duration of pulse P3. At all other times, a short circuit condition to ground exists between the ends of drive coil 19, through transistors 148 and 150. As a result, the voltage waveform shown as "a" in FIG. 10 appears at point "a" shown in FIG. 9, while voltage waveform "b" in FIG. 10 appears at point "b". The dotted line portions of these waveform diagrams indicate the voltage waveforms which would appear if a short circuit condition were not established through transistors 148 and 150. As can be seen, during the short times following each drive pulse during which transistor 148 or 150 is non-conducting, voltage pulses appear at points "a" and "b", whose amplitude is proportional to the reverse EMF, i.e. to the rate of movement of the rotor of pulse motor 18.

Detection circuit 88 serves to detect the amplitude of these voltage pulses. If the amplitude of the voltage pulses is above the threshold voltage of inverter 152 (for point "a") or of inverter 154 (for point "b"), then an output is produced by the inverter concerned, which is applied to selector circuit 156. Signals F0 and F0 applied to selector circuit 156 from FF 111 serve to select the detection timings when detection is performed. The output from detection circuit 156 is applied to the reset terminal of FF 158. Signals P1 and P2 are applied to the set terminal of FF 158 through OR gate 162, so that output F3 of FF 158 goes to the H level when a F2 pulse or P2 pulse occurs. Output F3 is applied to the data terminal of data type flip-flop 160, so that the output terminal Q6 of FF 160 goes to the level of output F3 of FF 158 when the next P7 pulse occurs, since signals P7 is applied to the clock terminal of FF 160. Thus, if a pulse of amplitude higher than the threshold level is detected at time P3 or P4, FF 158 is reset so that output Q6 of FF 160 goes to the L level. As a result, signal P6 is selected by detection circuit 134. The drive signals produced by NAND gates 136 and 138 are therefore modulated by signal P6. For the embodiment being described, this corresponds to a percentage modulation of 50% (where a percentage modulation of 0% corresponds to zero modulation, i.e. to a continuous pulse). The drive pulses therefore have 50% modulation when a normal load is being applied to pulse motor 18.

When an abnormally heavy load is applied to pulse motor 18, then the rotor will be moving more slowly during detection periods P3 and P4 than in the case of a normal load. Thus, the amplitude of the pulses applied to load detection circuit 88 will decrease, and fall below the threshold of inverters 152 and 154. As a result, no output signal will be produced from selector circuit 156 to reset FF 158. The level of output F3 of FF 158, and hence of output Q6 of FF 160, will therefore be at the H level during the next P1 or P2 pulse to occur following detection of the overload condition. Selector circuit 134 will therefore select the output of OR gate 130, which is the OR combination of signals P5 and P6, as the modulation signal to be applied to NAND gates 136 and 138. This results in the percentage modulation of the drive pulses becoming 25%. In other words, the duty cycle of the high frequency pulses constituting each drive pulse is increase by a factor of 1.5.

Figures 11A, 11H:
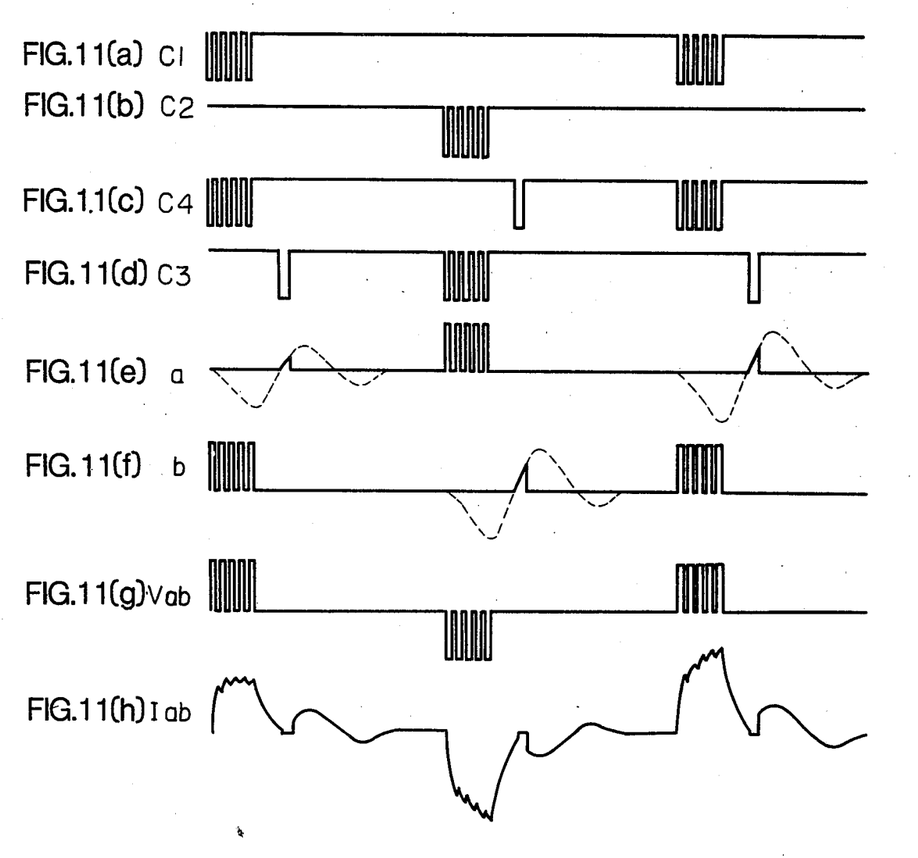

The effect of the change in percentage modulation of the drive pulses when an abnormal load is detected is shown in the bottom diagram of FIG. 11. This shows the current flowing through the drive coil 19, i.e. the current flowing between points "a" and "b". It can be seen that the peak current flowing in the drive coil is increased when the percentage modulation of the drive pulses is increased. The increase in peak current is proportional to the increase in duty cycle of the high frequency pulses in the drive pulses, i.e. 1.5 times for the embodiment being described. Thus, increased energy is supplied to the pulse motor when an abnormally heavy load is applied to the motor.

During the drive coil voltage detection intervals, corresponding to the timing of signals P3 and P4, an open circuit condition exists between the ends of drive coil 19. It is therefore desirable to keep this time as short as possible, and preferably less than 5 milliseconds. If this is done, and if the timing of P3 and P4 relative to the drive pulses is suitably arranged, then the danger of duplicate stepping of the pulse motor by a single drive pulse can be eliminated. This is due to the damping on the motor rotor provided by the short circuit condition between the ends of drive coil 19 which exists before and after each of the detection intervals P3 and P4. In addition, the short circuit condition established across the drive coil immediately after each drive pulse serves to prevent a voltage spike being developed across the drive coil due to a sudden open circuit condition.

When the abnormally high motor load is removed, then this fact is detected by detection circuit 88, which acts in conjunction with selector circuit 134 to return the percentage modulation of the drive pulses to the normal value. Since detection of an abnormal load condition occurs immediately, and increased torque is provided by the next drive pulse following detection of the abnormal load, increased reliability of operation is ensured by the method of the present invention. In addition, since it is only necessary to provide the minimum current necessary when the pulse motor is operating under normal load, without the necessity for providing an additional margin of current to allow for abnormal load conditions, the power consumption of the pulse motor can be significantly reduced by comparison with a conventional method of driving the motor.

Although for the embodiment of the present invention described above, the detection of the load condition of the pulse motor is performed a short time after the end of each drive pulse, alternative arrangements are possible. For example, one of the high frequency pulses constituting a drive pulse can be eliminated, and that time interval used to detect the voltage across the drive coil of the motor. It is also possible to install additional components such as coils to perform detection, separate from the drive coil of the motor. A mechanism for detecting the angular position of the rotor may be connected to a gear train which is coupled to the pulse motor.

With the second embodiment of the present invention described above, as for the first embodiment, the peak current which flows in the drive coil of the pulse motor is determined by the duty cycle of high frequency pulses constituting the drive pulses. Thus, it is not necessary to limit the peak current by utilizing a large number of turns of very small diameter wire for the drive coil. Thus, the advantages of ease of manufacture and a capability of producing pulse motors of extremely small size, enumerated previously for the first embodiment of the present invention, are also valid for the second embodiment. In addition, due to the drive pulses being of fixed length but variable percentage modulation, sampling of the voltage across the drive coil can be performed in a simple and effective manner at a short time following the end of each drive pulse.

It should also be noted that, although the embodiment described above has only a capability for detecting an abnormally high load upon the pulse motor, the method of the present invention can also be used to compensate for changes in battery voltage, ambient temperature, humidity, etc., by incorporating suitable detection means.

In addition, although the second embodiment described above utilizes a percentage modulation of 50% in the case of normal motor load and 25% in the case of abnormally high motor load, these figures are only given by way of example. Other degrees of modulation can be used, and for example it is possible to make the modulation 0% in the case of an abnormally high motor load, i.e. to provide continuous drive pulses with no high frequency component.

What is claimed is:

1. A drive system for driving a pulse motor of an electronic timepiece, comprising:
    a source of a standard frequency signal of relatively high frequency;
    a frequency divider responsive to said standard frequency signal for providing a train of low frequency pulses and first and second trains of high frequency pulses each being of substantially higher frequency than said low frequency pulse train, the duty cycles of said first and second high frequency pulse trains being mutually different;
    detection circuit means coupled to each end of a drive coil of said pulse motor for periodically detecting a reverse voltage produced across said drive coil due to motion of a rotor of said pulse motor, to produce a detection signal when said reverse voltage is above a predetermined level;
    modulation circuit means responsive to said detection signal produced by said detection circuit means for selectively modulating said low frequency pulse train by said first high frequency pulse train to produce a first train of composite drive input pulses and modulating said low frequency pulse train by said second high frequency pulse train to produce a second train of composite drive input pulses; and drive circuit means comprising a first pair of CMOS transistors comprising a P-channel and a N-channel transistor and a second pair of CMOS transistors comprising a P-channel and an N-channel MOS transistor, with the drain terminals of said first pair of CMOS transistors being connected in common to one end of a drive coil of said pulse motor and with the drain terminals of said second pair of CMOS transistors being connected in common to the other end of said drive coil, the source terminals of said N-channel transistors of said first and second pairs of CMOS transistors being connected in common to a low potential of said battery and the source terminals of said P-channel transistors of said first and second pairs of CMOS transistors being connected in common to a high potential of said battery, gate terminals of said first and second pairs of CMOS transistors being coupled to receive said composite input drive pulses such that a first condition in which said P-channel transistor of one of said two pairs of CMOS transistors and said N-channel transistor of the other of said two pairs of CMOS transistors are conducting and a second condition in which the P-channel transistor of the other of said two pairs of said CMOS transistors and the N-channel transistor of said one of said two pairs of said CMOS transistors are conducting are alternately repeated in response to said high frequency pulses in each of said composite input drive pulses, said drive circuit means being responsive to said first and second composite drive input pulses for producing first and second composite drive signals respectively, said first and second composite drive signal pulses being coupled to said drive coil of said pulse motor;

whereby each of said composite drive signal pulses applied to said pulse motor comprises a plurality of high frequency pulses, with the duty cycle of said high frequency pulses being selectively determined in accordance with the rotational speed of the rotor of said pulse motor when said periodic detection of said drive coil reverse voltage is performed, and whereby said pulse motor is periodically actuated by said composite drive signal pulses to rotate at a rate determined by the repetition frequency of said composite drive signal pulses.

2. A drive system according to claim 1, and further comprising circuit means coupled to said frequency divider for producing detection control pulses corresponding in timing of said periodic detection of said drive coil reverse voltage by said detection circuit means, said drive circuit means being responsive to said detection control pulses for establishing an open circuit condition across said drive coil of the pulse motor and for establishing a short-circuit condition across said drive coil at a time other than during said detection control pulses and said composite drive input pulses, whereby electrodynamic damping is applied to the rotor of the said pulse motor at times other than during said composite drive input pulses and said periodic detection of said drive coil reverse voltage.

3. A drive system for driving a pulse motor of an electronic timepiece, including a source of a standard frequency signal, comprising:

a frequency divider responsive to said standard frequency signal for providing a plurality of timing signals of different frequencies;

pulse modulation circuit means responsive to said timing signals for providing composite input drive pulses, with at least an initial part of each of said composite input drive pulses comprising a plurality of high frequency pulses, with the pulse width of successive ones of said high frequency pulses in each composite input drive pulse increasing in a predetermined manner from the leading edge of that composite input drive pulses;

drive circuit means responsive to said composite input drive pulses for generating drive signal pulses to drive said pulse motor, the waveform of said drive signals being determined by said composite input drive pulses, whereby the rate at which energy is delivered to said pulse motor by each of said drive signal pulses increases in a predetermined manner from the leading edge of that drive signal pulse; and circuit means coupled to said frequency divider for producing detection control pulses, gate means coupled to receive said detection control pulses and said composite drive input pulses for thereby producing drive control pulses coincident in timing with said detection time intervals and said composite drive input pulses, said drive circuit means being responsive to said drive control pulses for establishing an open circuit condition across said drive coil of the pulse motor and for establishing a short-circuit condition across said drive coil in the absence of said drive control pulses, whereby electrodynamic damping is applied to the rotor of said pulse motor at times other than during said composite drive input pulses and said predetermined detection time intervals.

4. A drive system for driving a pulse motor of an electronic timepiece having time indicating hands driven by said pulse motor, comprising:

a source of a standard frequency signal of relatively high frequency;

a frequency divider responsive to said standard frequency signal for providing a train of low frequency pulses and another train of high frequency pulses being of substantially higher frequency than said low frequency pulse train;

modulation circuit means reponsive to said low frequency pulse train and said high frequency pulse train to produce a train of drive input pulses composed of said high frequency pulses; and drive circuit means comprising a first pair of CMOS transistors comprising a P-channel and a N-channel transistor and a second pair of CMOS transistors comprising a P-channel and an N-channel MOS transistor, with the drain terminals of said first pair of CMOS transistors being connected in common to one end of a drive coil of said pulse motor and with the drain terminals of said second pair of CMOS transistors being connected in common to the other end of said drive coil, the source terminals of said N-channel transistors of said first and second pairs of CMOS transistors being connected in common to a low potential of said battery and the source terminals of said P-channel transistors of said first and second pairs of CMOS transistors being connected in common to a high potential of said battery, gate terminals of said first and second pairs of CMOS transistors being coupled to receive said train of said input drive pulses such that a first condition in which said P-channel transistor of one of said two pairs of CMO transistors and said N-channel transistor of the other of said two pairs of CMOS transistors are conducting and a second condition in which the P-channel transistor of the other of said two pairs of said CMOS transistors and the N-channel transistor of said one of said two pairs of said CMOS transistors are conducting are alternately repeated in response to said input drive pulse train for thereby enabling said pulse motor to be driven by a low voltage.

* * * * *